US010007896B2

(12) United States Patent
Tsurumi et al.

(10) Patent No.: US 10,007,896 B2
(45) Date of Patent: Jun. 26, 2018

(54) MAIL MONITORING SYSTEM, NON-TRANSITORY COMPUTER READABLE STORAGE MEDIUM, AND MAIL MONITORING APPARATUS

(75) Inventors: Seigo Tsurumi, Hiroshima (JP); Shinji Matsune, Hiroshima (JP); Kanako Ogasawara, Hiroshima (JP)

(73) Assignee: FUJITSU LIMITED, Kawasaki (JP)

( * ) Notice: Subject to any disclaimer, the term of this patent is extended or adjusted under 35 U.S.C. 154(b) by 437 days.

(21) Appl. No.: 13/137,857

(22) Filed: Sep. 19, 2011

(65) Prior Publication Data
US 2012/0079042 A1 Mar. 29, 2012

(30) Foreign Application Priority Data
Sep. 29, 2010 (JP) ................................. 2010-219719

(51) Int. Cl.
G06F 15/16 (2006.01)
G06Q 10/10 (2012.01)
H04L 12/24 (2006.01)
H04L 12/58 (2006.01)

(52) U.S. Cl.
CPC ......... G06Q 10/107 (2013.01); H04L 41/069 (2013.01); H04L 51/00 (2013.01)

(58) Field of Classification Search
CPC ...... G06Q 10/107; H04L 12/585; H04L 12/58
USPC ........................................................ 709/206
See application file for complete search history.

(56) References Cited

U.S. PATENT DOCUMENTS

| 7,690,038 B1* | 3/2010 | Ko ....................... H04L 63/1425 726/24 |
| 2005/0102499 A1 | 5/2005 | Kosuga et al. |
| 2008/0018927 A1* | 1/2008 | Martin .................... G06F 21/74 358/1.15 |
| 2009/0097662 A1* | 4/2009 | Olechowski .......... G06F 21/554 380/286 |
| 2010/0011053 A1* | 1/2010 | Bhogal et al. ................ 709/203 |
| 2011/0219081 A1* | 9/2011 | Parthasarathy ......... H04L 51/12 709/206 |

FOREIGN PATENT DOCUMENTS

| JP | 2005-101883 | 4/2005 |
| JP | 2006-235949 | 9/2006 |
| JP | 2007-087327 | 4/2007 |
| JP | 2008-245229 | 10/2008 |

* cited by examiner

Primary Examiner — Alan S Chou

(57) ABSTRACT

A mail monitoring system comprises a mail communications apparatus and a control server that controls a log relating to operation of the apparatus. The apparatus includes a detector that detects transmission of an e-mail, a log generation unit that determines whether to generate a transmission log based on a set policy, and generates the transmission log, a mail creating unit that determines whether to store mail information based on the set policy, and generates the mail information, and a transmitter that transmits the mail information and the transmission log to the server, and transmits the e-mail to a mail server designated as a transmission destination of the e-mail. The server includes a receiver that receives the transmission log and the mail information and a storage unit that stores therein the transmission log and the mail information when the receiver receives the transmission log and the mail information.

14 Claims, 9 Drawing Sheets

FIG.3

| 42A | 42B | 42C | 42D | 42E | 42F | 42G | 42H |
|---|---|---|---|---|---|---|---|
| PC NAME | TRANSMISSION DATE-TIME | USER'S NAME | DOMAIN NAME | TYPE | COLLECTION CATEGORY | PRESENCE OR ABSENCE OF SUPPLEMENTARY CONDITION | REMARKS |
| PC01 | 2010/8/24 20:30:40 | Ando | S-DOM | MAIL TRANS-MISSION | NORMAL | | MAIL HAS BEEN TRANSMITTED [TITLE: TODAY'S BUSINESS REPORT; FROM: MAIL ADDRESS-A; TO: MAIL ADDRESS-B; CC: MAIL ADDRESS-C; MAIL BCC: MAIL ADDRESS-D; ATTACHMENT: BUSINESS REPORT. DOC] MAILER [BIRD. EXE] |
| PC01 | 2010/8/25 10:27:56 | Ando | S-DOM | MAIL TRANS-MISSION | NORMAL | PRESENT | MAIL HAS BEEN TRANSMITTED [TITLE: SENDING OF CUSTOMER INFORMATION LIST; FROM: MAIL ADDRESS-A; TO: MAIL ADDRESS-B; CC: MAIL ADDRESS-C; MAIL BCC: ADDRESS-D; ATTACHMENT: CUSTOMER LIST. XLS] MAILER [BIRD. EXE] |

FIG.4

| CONTROL USER'S NAME | ADMINISTRATOR CATEGORY | ACCESSIBLE GROUP | TRANSMISSION LOG ACCESS RIGHT | MAIL CONTENT ACCESS RIGHT |
|---|---|---|---|---|
| SystemAdmin | SYSTEM ADMINISTRATOR | ALL DEPARTMENTS | PERMITTED | PERMITTED |
| EigyoAdmin | DEPARTMENT ADMINISTRATOR | SALES DEPARTMENT | PERMITTED | PERMITTED |
| SoumuAdmin | DEPARTMENT ADMINISTRATOR | GENERAL ADMINISTRATION DEPARTMENT | PERMITTED | REJECTED |
| SoumuAdmin2 | DEPARTMENT ADMINISTRATOR | GENERAL ADMINISTRATION DEPARTMENT | REJECTED | REJECTED |
| InfoAdmin | DEPARTMENT ADMINISTRATOR | SALES DEPARTMENT, GENERAL ADMINISTRATION DEPARTMENT | PERMITTED | PERMITTED |

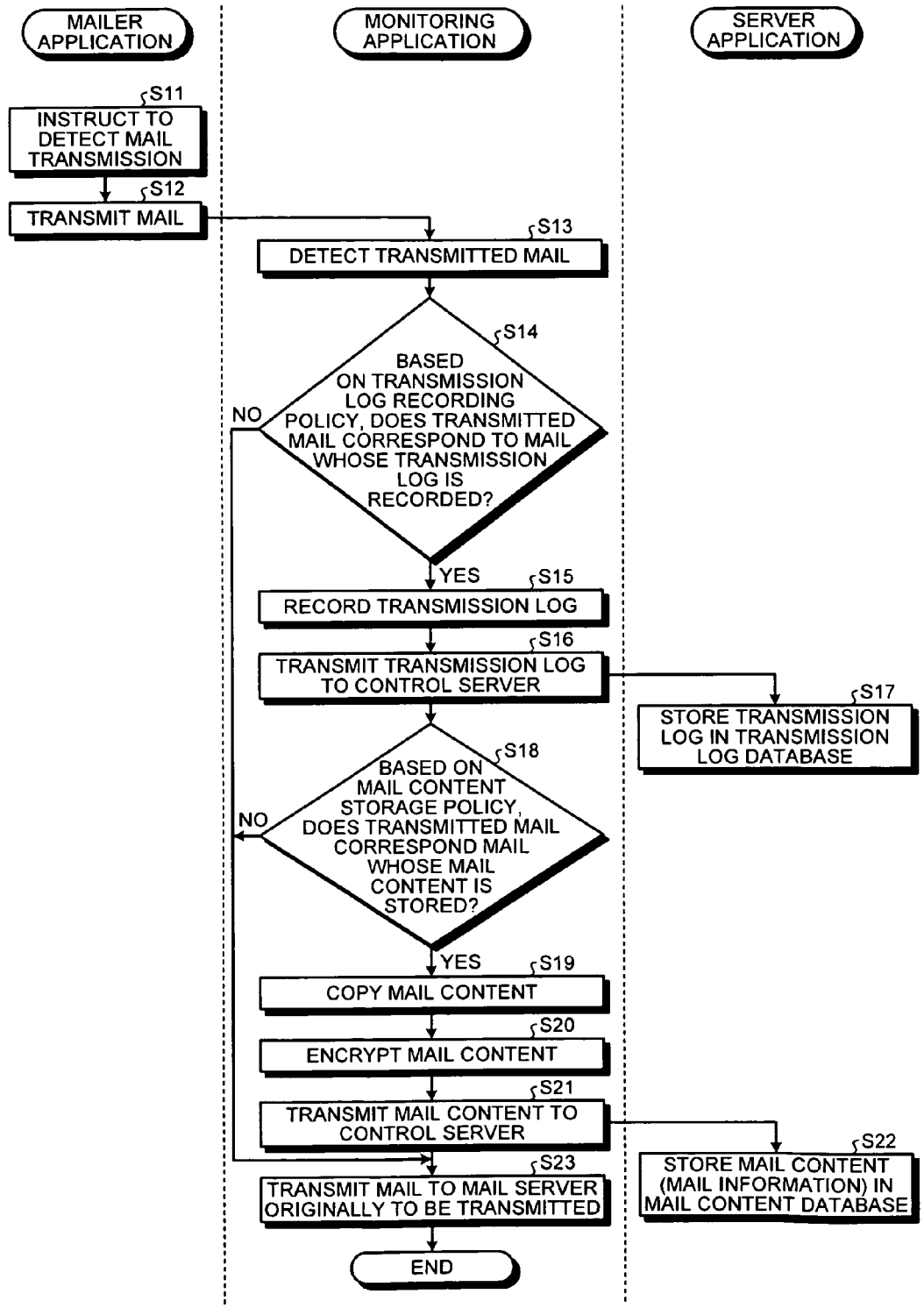

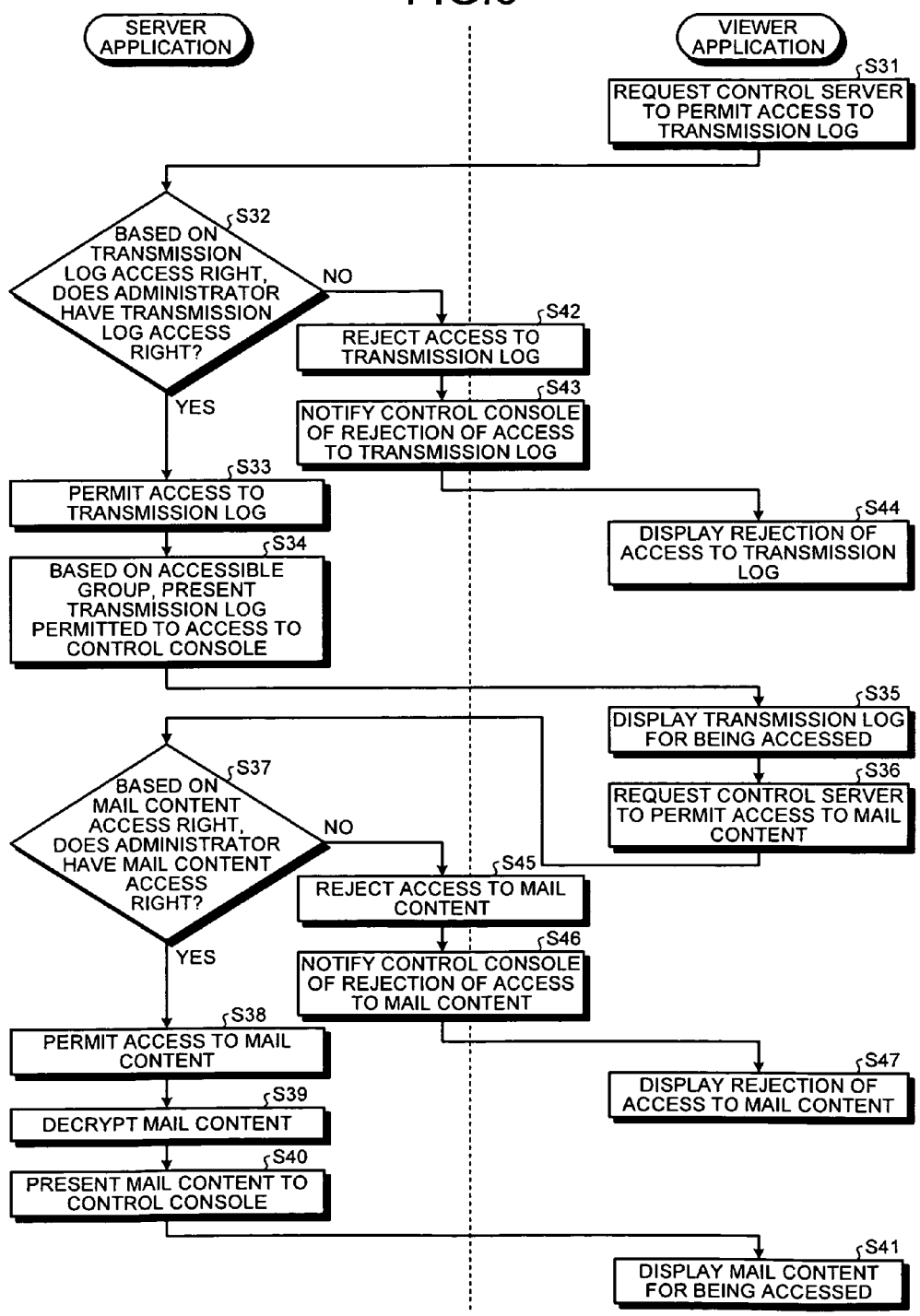

FIG.8

| PC NAME (41D) | TRANSMISSION LOG RECORDING POLICY (41B) | MAIL CONTENT STORAGE POLICY (41C) |
|---|---|---|
| PC001 | RECORDED | NOT STORED |
| PC002 | NOT RECORDED | - |
| PC003 | RECORDED | STORED |

FIG.9

| USER'S NAME (41A) | TRANSMISSION LOG RECORDING POLICY (41B) | PERMITTED DOMAIN NAME (41E) | REJECTED DOMAIN NAME (41F) | ATTACHED FILE (41G) | DESIGNATED EXTENSION (41H) |
|---|---|---|---|---|---|
| Ando | RECORDED | - | bat.com | PERMITTED | - |
| Inoue | RECORDED | jp.AAA.com | - | PERMIT ENCRYPTED FILE ONLY | - |
| Ueda | RECORDED | jp.AAA.com | - | PERMIT DESIGNATED EXTENSION ONLY | xls Doc |
| Ebara | RECORDED | jp.AAA.com | - | PROHIBIT DESIGNATED EXTENSION ONLY | pdf |

MAIL MONITORING SYSTEM, NON-TRANSITORY COMPUTER READABLE STORAGE MEDIUM, AND MAIL MONITORING APPARATUS

CROSS-REFERENCE TO RELATED APPLICATION

This application is based upon and claims the benefit of priority of the prior Japanese Patent Application No. 2010-219719, filed on Sep. 29, 2010, the entire contents of which are incorporated herein by reference.

FIELD

The embodiments discussed herein are directed to a mail monitoring system, a non-transitory computer readable storage medium, a mail monitoring apparatus, and a mail monitoring method.

BACKGROUND

Recently, information leakage prevention is a issue for businesses from a compliance point of view. Therefore, many companies store contents of in-house e-mails and attached files, which can cause information leakage, under strict control. As a technique to store the contents and attached files of e-mails, a function is known that is provided in a mail server relaying e-mails and automatically stores all of the contents and the attached files of the e-mails relayed in the mail server (for example, refer to Japanese Laid-open Patent Publication No. 2008-245229).

Such a mail server requires a huge amount of storage capacity for its function of storing all of the contents and the attached files of the e-mails relayed therein. However, when information leakage via an e-mail occurs, an administrator can know the content of the e-mail having caused the information leakage because all of the contents and the attached files of e-mails are stored in the mail server.

Another technique is known that a client computer provided with a mail wrong transmission monitor notifies a user of possibility of wrong transmission based on determination performed by the mail wrong transmission monitor on possibility of wrong transmission (for example, refer to Japanese Laid-open Patent Publication No. 2006-235949).

If a malicious user transmits an e-mail by using another mail server having no mail content storage function for the purpose of keeping out of the administrator's monitoring, the mail server has no way to store the content and the attached file of the e-mail of the malicious user. As a result, the administrator also has no way to know the content and the attached file of the e-mail of the malicious user. If information leakage via the e-mail is exposed, it is difficult for the administrator to identify the content of the e-mail having caused the information leakage, and the administrator is likely to fall behind in addressing the information leakage after the information leakage is exposed.

Although the mail server can store the contents and the attached files of e-mails, it is difficult for the mail server to acquire operation logs when the e-mails are transmitted. Thus, it is difficult for the administrator to identify a transmission log that is evidence of the information leakage. As a result, it is difficult for the administrator to identify the origin of the e-mail having caused the information leakage, and the administrator is likely to fall behind in addressing the information leakage.

The technique disclosed in Japanese Laid-open Patent Publication No. 2006-235949 can determine possibility of wrong transmission before an e-mail is transmitted to a server. However, the technique disclosed in Japanese Laid-open Patent Publication No. 2006-235949 cannot monitor e-mails for the purpose of information leakage prevention or make necessary information available in case of future information leakage.

SUMMARY

According to an aspect of an embodiment of the invention, a mail monitoring system includes a mail communications apparatus; and a control server that controls a log relating to operation of the mail communications apparatus, wherein the mail communications apparatus includes: a detector that detects transmission of an e-mail by the mail communications apparatus; a log generation unit that determines whether to generate a transmission log relating to the transmission of the e-mail on the basis of a set policy relating to the e-mail, and generates the transmission log based on a result of the determination; a mail creating unit that determines whether to store mail information including information identifying the transmission log and information of a body of the e-mail on the basis of the set policy, and generates the mail information based on a result of the determination; and a transmitter that transmits the mail information and the transmission log to the control server, and transmits the e-mail to a mail server designated as a transmission destination of the e-mail; and the control server includes: a receiver that receives the transmission log and the mail information from the mail communications apparatus; and a storage unit that stores therein the transmission log and the mail information when the receiver receives the transmission log and the mail information.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is an explanatory view illustrating an example of a transmission log database;

FIG. 4 is an explanatory view illustrating an example of an access right policy table;

FIG. 5 is a flowchart illustrating processing operation that relates to mail monitoring processing of the first embodiment and is performed between a client terminal and a control server;

FIG. 6 is a flowchart illustrating processing operation that relates to mail access processing of the first embodiment and is performed between the control server and a control console;

FIG. 8 is an explanatory view illustrating an example of a log acquisition policy table;

FIG. 9 is an explanatory view illustrating an example of a log acquisition policy table.

DESCRIPTION OF EMBODIMENTS

Preferred embodiments of the present invention will be explained with reference to accompanying drawings.

The techniques disclosed herein are not limited to the embodiments.

[a] First Embodiment

Figure 1:
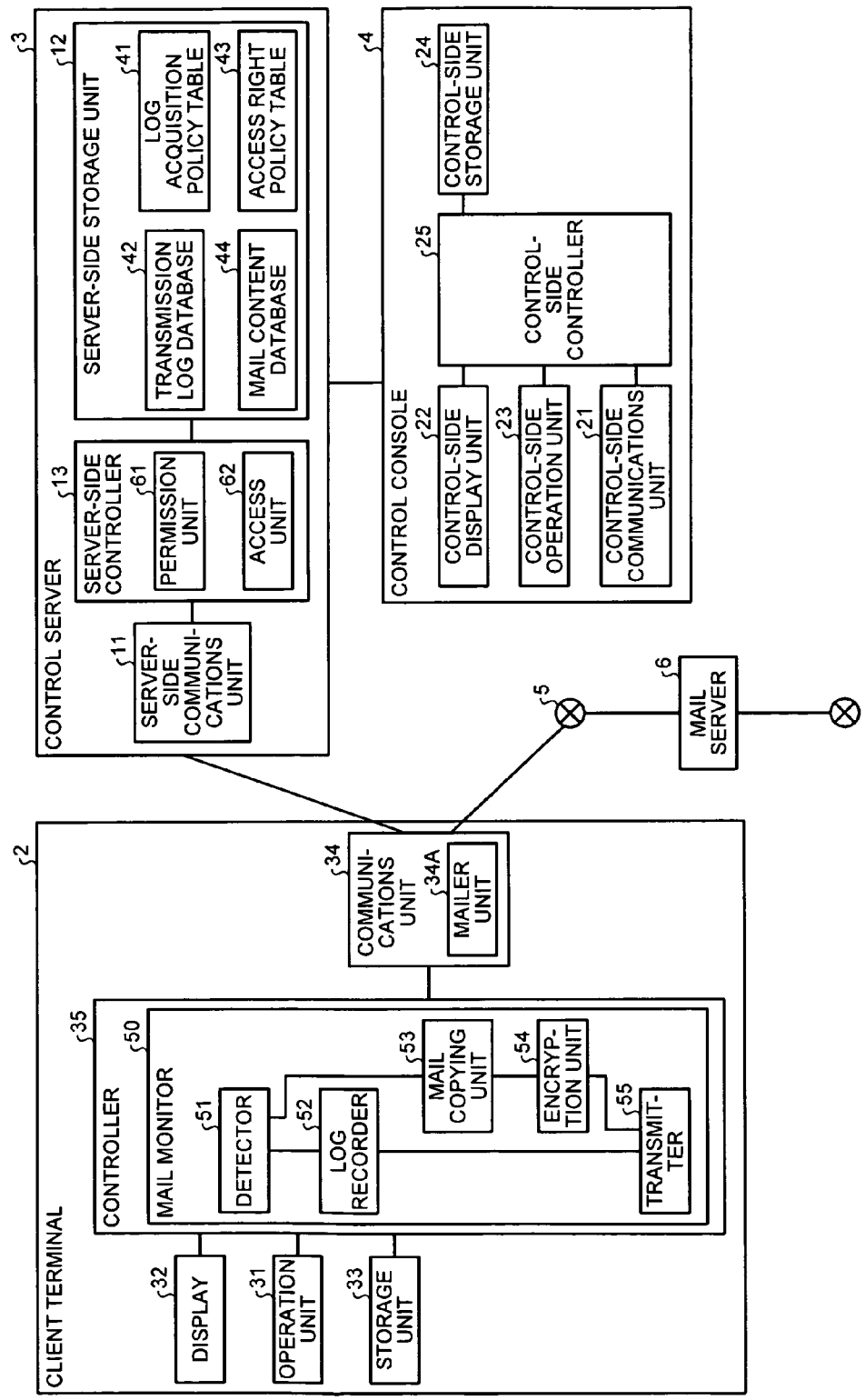
FIG. 1 is a block diagram illustrating a structure of a mail monitoring system according to a first embodiment.

FIG. 1 is a block diagram illustrating a structure of a mail monitoring system according to a first embodiment. A mail monitoring system 1 illustrated in FIG. 1 includes a client terminal 2, a control server 3 controlling the client terminal 2, and a control console 4 executing various settings of the control server 3. The control server 3 has a function to record operation of the client terminal 2 carrying a risk of information leakage, to repress problematic behaviors, and to prevent electronic information leakage.

For example, the control server 3 has the following functions: a logon control/recording function, a policy control function, an operation restriction/recording function, an original storage function of a taken-out file, and a service start control function. The logon control/recording function prohibits a logon to the client terminal 2 with account authority violating a policy, and records a logon and a logoff to the client terminal 2. The policy control function sets prohibit operation and logs to be collected with respect to each client terminal 2 and each group of the client terminals 2.

The operation restriction/recording function further has functions of an application start prohibiting function, a file operation restriction/recording function, a print screen key disabling function, a mail transmission restriction/recording function, and a mail file attachment restriction/recording function, for example. The application start prohibiting function acquires and controls application information having been installed in the client terminal 2, and prohibits starting of a designated application. The application start prohibiting function collects an operation log when detecting operation for starting a designated application. The file operation restriction/recording function prohibits transferring a file from the client terminal 2 by using an external medium, copying and printing of a file, for example, and also temporarily lifts the prohibition. The file operation restriction/recording function also records file operation, such as referencing, creating, updating, deleting, copying, moving, and renaming, as a log.

The print screen key disabling function prohibits operation of a print screen key acquiring a hard copy of a display image of the client terminal 2, and records the key operation as the log. The mail transmission restriction/recording function restricts transmitting a mail to a designated address from the client terminal 2 based on a policy set by an administrator, and records the mail. The mail file attachment restriction/recording function restricts transmitting a mail with an attached file from the client terminal 2 based on a policy set by an administrator, and records the mail.

The original storage function of a taken-out file forcibly encrypts a file to be taken-out when taking out the file to an external recording medium from the client terminal 2 is permitted. The original storage function of a taken-out file also records a log of the taking out the file, and stores the original of the file in the control server 3. The service start control function acquires a list of services available on the client terminal 2 by being started, and also restricts starting of any service by remote operation.

In addition, the control server 3 has a recording function of changing constituting devices, a display image capture function, a file tracking function, and a mail notification function, for example. The recording function of changing constituting devices determines change of constituting devices when an external recording medium such as a universal serial bus (USB) memory device is connected to the client terminal 2, and records the log of the change. The display image capture function acquires a snapshot (a hard copy) of a display image (window) of the client terminal 2 when the title name of the display image includes a specific application name or a specific key word.

The file tracking function searches the log, based on logs of file operation, in a back trace direction or a forward trace direction for operation records of the file, such as referencing, creating, updating, deleting, copying, moving, and renaming, for example. The file tracking function in the back trace direction searches the log for the operation records of the file by tracing past records. The file tracking function in the forward trace direction searches the log for the operation records of the file by tracing records in temporal sequence. The mail notification function notifies, when specific operation, e.g., violating operation, is detected in the client terminal 2, the control console 4 serving as an administrator of the occurrence of the specific operation via a mail.

The control server 3 illustrated in FIG. 1 includes a server-side communications unit 11, a server-side storage unit 12, and a server-side controller 13. The server-side communications unit 11 communicates with the client terminal 2 and the control console 4. The server-side communications unit 11 operates as a receiver that receives a transmission log (described later), and a mail content from the client terminal 2, and also operates as a server-side transmitter that outputs the mail content and the transmission log to the control console 4. The server-side storage unit 12 stores therein various information, and includes a log acquisition policy table 41, a transmission log database 42, an access right policy table 43, and a mail content database 44. The log acquisition policy table 41 controls log acquisition policies on a user-to-user basis.

Figure 2:
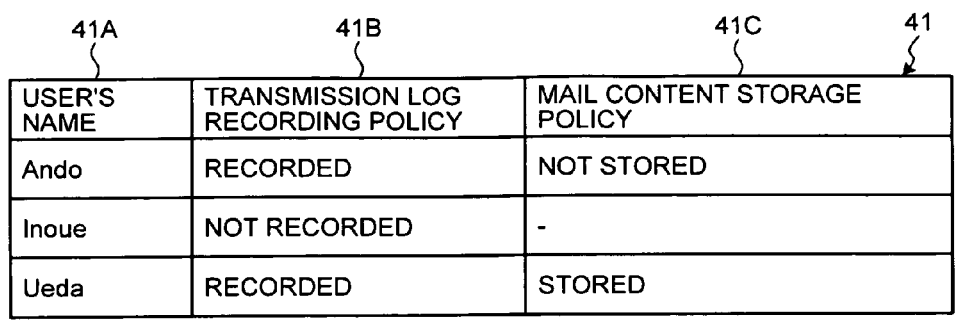
FIG. 2 is an explanatory view illustrating an example of a log acquisition policy table.

FIG. 2 is an explanatory view illustrating an example of the log acquisition policy table 41. The log acquisition policy table 41 illustrated in FIG. 2 controls a transmission log recording policy 41B and a mail content storage policy 41C with respect to each user's name 41A. The transmission log recording policy 41B specifies a condition of whether the transmission log of a transmitted mail is recorded. The mail content storage policy 41C specifies a condition of whether the content of a transmitted mail is stored.

In the case of "Ando" of the user's name 41A in FIG. 2, the transmission log recording policy 41B is set as "recorded" while the mail content storage policy 41C is set as "not stored". That is, a policy that the transmission log of a transmitted mail is recorded and the content of the transmitted mail is not stored is set for the user's name "Ando". In the case of "Ueda" of the user's name 41A, the transmission log recording policy 41B is set as "recorded" while the mail content storage policy 41C is set as "stored". That is, a policy that the transmission log of a transmitted mail is recorded and the content of the transmitted mail is stored is set for the user's name "Ueda".

The transmission log database 42 stores therein the transmission log of a mail transmitted from the client terminal 2. FIG. 3 is an explanatory view illustrating an example of the transmission log database 42. The transmission log database 42 illustrated in FIG. 3 controls a PC name 42A, a transmission date-time 42B, a user's name 42C, a domain name 42D, a type 42E, a collection category 42F, a presence or absence of supplementary condition 42G, and remarks 42H by associating them with each other. The PC name 42A corresponds to a name of an apparatus, such as the client terminal 2 having executed mail transmission. The transmission date-time 42B corresponds to transmission date and time of a transmitted mail. The user's name 42C corresponds to a name of a user who had logged on the client terminal 2 having executed mail transmission. The domain name 42D corresponds to a name of a domain to which an apparatus, such as the client terminal 2 having executed mail transmission, belongs.

The type 42E corresponds to a type of log, such as mail transmission. The collection category 42F represents that a collected log is related to violating operation or normal operation, for example. The presence or absence of supplementary condition 42G represents whether a mail content is stored, for example. The remarks 42H includes a title of a transmitted mail, a transmission origin address, a transmission destination address (including carbon copy (CC), and blind carbon copy(BCC)), a name of an attached file, and a name of a mailer being used.

In the example of FIG. 3, the transmission log includes the PC name "PC01", the transmission date and time "2010/8/24 20:30:40", the user's name "Ando", the domain name "S-DOM", the type of log "mail transmission", and the collection category "normal". The transmission log also includes the remarks "mail has been transmitted [Title: today's business report From: Mail Address-A To: mail address-B CC: Mail Address-C BCC: Address-D Attachment: business report. doc] mailer [bird. exe]".

The access right policy table 43 controls access right to the transmission log database 42 and the mail content database 44 with respect to each control user's name 43A of the control console 4. FIG. 4 is an explanatory view illustrating an example of the access right policy table 43. The access right policy table 43 illustrated in FIG. 4 controls an administrator category 43B, an accessible group 43C, transmission log access right 43D, and mail content access right 43E with respect to each control user's name 43A.

The control user's name 43A corresponds to an administrator's name. The administrator category 43B corresponds to a category of the administrator. The accessible group 43C corresponds to a group that the administrator can access, such as an in-house department. The transmission log access right 43D represents whether the administrator has access right to a transmission log relating to the accessible group in the transmission log database 42. The mail content access right 43E represents whether the administrator has access right to a mail content relating to the accessible group in the mail content database 44.

In the example of FIG. 4, an access right policy is set for "System Admin" of the control user's name 43A as follows: the administrator category 43B is "system administrator", the accessible group 43C is "all departments", the transmission log access right 43D is "permitted", and the mail content access right 43E is "permitted". That is, "System Admin" is accessible to all departments as the accessible group, and has the transmission log access right and the mail content access right. For "Soumu Admin" of control user's name 43A, an access right policy is set as follows: the administrator category 43B is "department administrator", the accessible group 43C is "general administration department", the transmission log access right 43D is "permitted", and the mail content access right 43E is "rejected". That is, "Soumu Admin" is accessible to the general administration department as the accessible group, and has the transmission log access right but does not have the mail content access right.

The control console 4 illustrated in FIG. 1 corresponds to a personal computer, for example. The control console 4 includes a control-side communications unit 21, a control-side display 22, a control-side operation unit 23, a control-side storage unit 24, and a control-side controller 25. The control console 4 operates as a control terminal apparatus communicating with the control server 3. The control-side communications unit 21 communicates with the control server 3. The control-side display 22 displays various information on display image thereof, and corresponds to a monitor, for example. The control-side operation unit 23 corresponds to a mouse or a keyboard through which various information is input, for example. The control-side storage unit 24 stores therein various information. The control-side controller 25 controls the whole of the control console 4.

The client terminal 2 corresponds to a personal computer, for example. The client terminal 2 includes an operation unit 31, a display 32, a storage unit 33, a communications unit 34, and a controller 35. The operation unit 31 corresponds to a mouse or a keyboard through which various information is input, for example. The client terminal 2 operates as a mail communications apparatus transmitting and monitoring a mail. The display 32 displays various information on display image thereof, and corresponds to a monitor, for example. The storage unit 33 stores therein various information. The storage unit 33 corresponds to a memory. The communications unit 34 communicates with the control server 3 and also communicates with a mail server 6 as a transmission destination on a network 5. The communications unit 34 includes a mailer unit 34A transmitting a mail to the mail server 6 as a transmission destination on the network 5.

The client terminal 2 adopts a multi-user method by which a plurality of users can use the client terminal 2 by changing a logon user's name. The client terminal 2 acquires, from the control server 3, the transmission log recording policy 41B and the mail content storage policy 41C of the user's name 41A who uses the client terminal 2 in the log acquisition policy table 41. The controller 35 stores the acquired transmission log recording policy 41B and the mail content storage policy 41C of the user's name 41A in the storage unit 33. The controller 35 corresponds to processor.

The controller 35 includes a mail monitor 50. The mail monitor 50 is achieved by a monitoring application that monitors, in a software manner, a transmission port used for transmitting a mail outside the client terminal 2 from the mailer unit 34A. The mail monitor 50 includes a detector 51, a log recorder 52, a mail copying unit 53, an encryption unit 54, and a transmitter 55. The detector 51 monitors the transmission port (not illustrated) and detects a transmitted mail transmitted from the mailer unit 34A. When the detector 51 detects a transmitted mail, the log recorder 52 acquires the user's name of the transmitted mail. The log recorder 52 acquires a transmission log recording policy corresponding to the acquired user's name from the storage unit 33. The log recorder 52 determines, based on the transmission log recording policy, whether the transmitted mail corresponds to the mail whose transmission log is recorded. When the transmitted mail corresponds to the mail whose transmission log is recorded, the log recorder 52 records the transmission log of the transmitted mail as illustrated in FIG. 3.

When the detector 51 detects a transmitted mail, the mail copying unit 53 acquires the user's name of the transmitted mail. The mail copying unit 53 acquires a mail content storage policy corresponding to the acquired user's name from the storage unit 33. The mail copying unit 53 determines, based on the mail content storage policy, whether the transmitted mail corresponds to the mail whose content is stored. When the transmitted mail corresponds to the mail whose content is stored, the mail copying unit 53 copies the content of the transmitted mail. The mail content includes an attached file when the transmitted mail includes the attached file, in addition to the body of the transmitted mail. The mail copying unit 53 determines, based on a set policy, whether mail information including information identifying the transmission log and information of the body of the mail is stored, and based on the determination result, operates as a mail creating unit that creates a mail content.

The encryption unit 54 encrypts the mail content copied by the mail copying unit 53. The transmitter 55 transmits the transmission log of the transmitted mail recorded in the log recorder 52 to the control server 3. The transmitter 55 transmits the mail content encrypted by the encryption unit 54 to the control server 3. Furthermore, the transmitter 55 transmits a transmitted mail stopped to be output at the transmission port, i.e., the transmitted mail detected by the detector 51, to the mail server 6 that is the original transmission destination. The controller 35 has the mail transmission restriction/recording function that prohibits transmitting a mail to a designated address based on the set policy, as aforementioned. Therefore, when the transmission address of a transmitted mail includes a violating designated address, the controller 35 prohibits transmitting the mail to the mail server 6. On the other hand, when the transmission address of a transmitted mail includes a normal designated address, the controller 35 permits transmitting the mail to the mail server 6.

The controller 35 has the mail file attachment restriction/recording function that restricts transmitting a mail with an attached file based on the set policy. Therefore, when a transmitted mail includes a violating attached file, the controller 35 prohibits transmitting the mail to the mail server 6. On the other hand, when a transmitted mail includes a normal attached file, the controller 35 permits transmitting the mail to the mail server 6.

When receiving the transmission log relating to a transmitted mail from the client terminal 2 through the server-side communications unit 11, the server-side controller 13 in the control server 3 illustrated in FIG. 1 stores the transmission log in the transmission log database 42. When receiving a mail content relating to a transmitted mail from the client terminal 2 through the server-side communications unit 11, the server-side controller 13 stores the mail content in the mail content database 44. The transmission log stored in the transmission log database 42 and the mail content stored in the mail content database 44 are associated with each other by using the user's name, the PC name, the transmission date and time, for example. The log recorder 52 may record another transmission log further including a log ID uniquely identifying the transmission log. In this case, the encryption unit 54 provides a log ID for the encrypted mail content. The transmission log and the mail content are associated with each other by the log ID. In this way, the client terminal 2 can associate the transmission log and the mail content with each other.

Furthermore, the server-side controller 13 includes a permission unit 61 and an access unit 62. When detecting an access request from the control console 4, the permission unit 61 determines whether an administrator has the access right to the transmission log and the mail content relating to a transmitted mail, based on an access right policy of the administrator of the control console 4. For example, the permission unit 61 identifies the accessible group in accordance with authentication operation of the administrator of the control console 4 who requests the access. After identifying the accessible group of the administrator, the permission unit 61 determines whether the administrator has the access right to the transmission log based on the transmission log access right 43D. When the administrator has the access right to the transmission log, the permission unit 61 permits the administrator of the control console 4 to access the transmission log of the accessible group in the transmission log database 42. Once the permission of access to the transmission log is given to the administrator of the control console 4, the access unit 62 presents the transmission log permitted to access to the control console 4.

Furthermore, when detecting a request of access to a mail content from the control console 4, the permission unit 61 determined whether the administrator has the access right to the mail content based on the mail content access right 43E. When the administrator has the access right to the mail content, the permission unit 61 permits the administrator of the control console 4 to access the mail content of the accessible group in the mail content database 44. Once the permission of access to the mail content is given to the administrator of the control console 4, the access unit 62 presents the mail content permitted to access to the control console 4.

Next, operation of the mail monitoring system 1 of the first embodiment is described. FIG. 5 is a flowchart illustrating processing operation that relates to mail monitoring processing of the first embodiment and is performed between the client terminal 2 and the control server 3. In the operation, a mailer application and a monitoring application are executed by the controller 35 of the client terminal 2 while a server application is executed by the server-side controller 13 of the control server 3.

The mailer application of the client terminal 2 illustrated in FIG. 5 detects an instruction to transmit a mail by the mailer unit 34A (step S11). Then, the mailer application transmits the mail to a transmission address (step S12). The monitoring application of the client terminal 2 allows the detector 51 to monitor the transmission port of the communications unit 34, and the detector 51 detects the transmitted mail from the mailer unit 34A (step S13). When detecting the transmitted mail, the monitoring application stops outputting the transmitted mail to the network 5 from the transmission port.

When the transmitted mail is detected, the monitoring application allows the log recorder 52 to determine whether the transmitted mail corresponds to the mail whose transmission log is recorded based on the transmission log recording policy 41B relating to a user's name of the transmitted mail (step S14). If the transmitted mail corresponds to the mail whose transmission log is recorded (YES at step S14), the monitoring application allows the log recorder 52 to record the transmission log (step S15). After the transmission log is recorded, the monitoring application allows the transmitter 55 to transmit the transmission log to the control server 3 (step S16). Meanwhile, when receiving the transmission log of the transmitted mail from the client terminal 2, the server application of the control server 3 stores the transmission log in the transmission log database 42 (step S17). In this way, the control server 3 can store the transmission log relating to a transmitted mail in the transmission log database 42.

After the transmission log is transmitted to the control server 3, the monitoring application allows the mail copying unit 53 to determine whether the transmitted mail corresponds to the mail whose mail content is stored based on the mail content storage policy 41C (step S18). When the transmitted mail corresponds to the mail whose mail content is stored (YES at step S18), the monitoring application allows the mail copying unit 53 to copy the mail content (step S19).

After the mail content is copied, the monitoring application allows the encryption unit 54 to encrypt the mail content (step S20). In the encryption, information to associate the log information and the mail content with each other is provided. The information to associate them with each other includes a user's name including log information, a PC name, transmission date and time, and a log ID. After the mail content is encrypted, the monitoring application allows the transmitter 55 to transmit the encrypted mail content to the control server 3 (step S21). When receiving the mail content from the client terminal 2, the server application of the control server 3 stores the received mail content in the mail content database 44 (step S22). In this way, the control server 3 can store the mail content relating to a transmitted mail in the mail content database 44.

Thereafter, the monitoring application awakes the output halt of the transmission port, and then transmits the transmitted mail having been stopped outputting to the mail server 6 as the original transmission destination (step S23). Then, the monitoring application ends the processing operation illustrated in FIG. 5.

In the mail monitoring processing illustrated in FIG. 5, even if a malicious user changes a transmission destination from the mail server 6 to another server, for example, the transmission log of a transmitted mail is recorded without depending on the mail server 6. Therefore, the administrator can have the transmission log of the transmitted mail. Furthermore, in the mail monitoring processing, even if a malicious user changes a transmission destination from the mail server 6 to another server, a mail content of a transmitted mail is copied and the copied mail content is stored in the mail content database 44 without depending on the mail server 6. Therefore, the administrator can know the mail content of the transmitted mail.

FIG. 6 is a flowchart illustrating processing operation that relates to mail access processing of the first embodiment and is performed between the control server 3 and the control console 4. In the operation, a viewer application is executed by the control-side controller 25 of the control console 4. The viewer application of the control console 4 detects a request to the control server 3 for access to a transmission log (step S31). When detecting the request of access to a transmission log, the server application of the control server 3 allows the permission unit 61 to determine whether the administrator of the control console 4 who requests the access has the access right to the transmission log based on the transmission log access right 43D (step S32).

When the administrator has the access right to the transmission log (YES at step S32), the server application allows the permission unit 61 to permit the administrator to access the transmission log (step S33). After the permission of access to the transmission log is given, the server application presents an accessible transmission log out of the transmission logs in the transmission log database 42 to the control console 4 based on the accessible group of the administrator of the control console 4 (step S34).

The viewer application displays the transmission log presented by the control server 3 on the control-side display 22 for being accessed (step S35). The administrator can access the accessible transmission log from the display of the transmission log for being accessed. Then, the viewer application detects a request to the control server 3 for access to a mail content relating to the transmission log displayed for being accessed (step S36). When detecting the request to the control server 3 for access to a mail content, the server application allows the permission unit 61 to determine whether the administrator of the control console 4 who requests the access has the access right to the mail content based on the mail content access right 43E (step S37).

When the administrator has the access right to the mail content (YES at step S37), the server application allows the permission unit 61 to permit the administrator to access the mail content (step S38). Then, when the permission of access to the mail content is given, the server application allows the access unit 62 to decrypt the cipher of the accessible mail content out of the mail contents in the mail content database 44 (step S39). After the cipher of the accessible mail content is decrypted, the server application presents the decrypted mail content to the control console 4 (step S40).

The viewer application displays the mail content presented from the control server 3 on the control-side display 22 for being accessed (step S41). Then, the viewer application ends the processing operation illustrated in FIG. 6. The administrator can know the accessible mail content from the display of the mail content for being accessed. When the administrator does not have the access right to the transmission log (NO at step S32), the server application allows the permission unit 61 to reject the administrator to access the transmission log (step S42), and notifies the control console 4 of rejection of access to the transmission log (step S43). When detecting the rejection of access to the transmission log, the viewer application displays the rejection of access to the transmission log on the control-side display 22 (step S44). Then, the viewer application ends the processing operation illustrated in FIG. 6. The administrator can know the rejection of access to the transmission log from the display of the rejection of access to the transmission log.

When the administrator does not have the access right to the mail content (NO at step S37), the server application allows the permission unit 61 to reject the administrator to access the mail content (step S45), and notifies the control console 4 of rejection of access to the mail content (step S46). When detecting the rejection of access to the mail content, the viewer application displays the rejection of access to the mail content on the control-side display 22 (step S47). Then, the viewer application ends the processing operation illustrated in FIG. 6. The administrator can know the rejection of access to the mail content from the display of the rejection of access to the mail content.

In the mail access processing illustrated in FIG. 6, when a request of access to a transmission log from an administrator is detected and the administrator has the access right to the transmission log in accordance with the transmission log access right of the administrator, the administrator can access the accessible transmission log in the transmission log database 42. Therefore, a transmission log can be prevented from being accessed by a third party who does not have the access right to the transmission log.

In the mail access processing, when a request of access to a mail content from an administrator is detected and the administrator has the access right to the mail content in accordance with the mail content access right of the administrator, the administrator can access the accessible mail content in the mail content database 44. Therefore, a mail content can be prevented from being accessed by a third party who does not have the access right to the mail content.

In the first embodiment, when detecting a mail that is ready to be transmitted outside the client terminal 2 from the mailer unit 34A, the client terminal 2 records the transmission log of the transmitted mail when the transmitted mail corresponds to the mail whose transmission log is recorded, based on the transmission log recording policy 41B. This results in an administrator can record the transmission log of a transmitted mail without depending on the mail server 6 even if a malicious user changes a transmission destination from the mail server 6 to another server.

In the first embodiment, the client terminal 2 copies a mail content of a transmitted mail when the transmitted mail corresponds to the mail whose mail content is stored, based on the mail content storage policy 41C. This results in an administrator can store a mail content of a transmitted mail without depending on the mail server 6 even if a malicious user changes a transmission destination from the mail server 6 to another server.

In the first embodiment, the control server 3 controls the transmission log and the mail content relating to a transmitted mail by associating them with each other. As a result, an administrator can control the transmission log and the mail content relating to a transmitted mail because the transmission log and the mail content relating to the transmitted mail are associated with each other. Even if information leakage via a transmitted mail is exposed, for example, the origin and the content of the transmitted mail having caused the information leakage can be promptly identified based on the transmission log and the mail content.

In the first embodiment, the transmission log and the mail content relating to a transmitted mail necessary for being stored can be stored by appropriately changing settings of the transmission log recording policy 41B and the mail content storage policy 41C. As a result, the storage capacity for storing them can be suppressed. In addition, processing burden for recording the transmission log and storing the mail content relating to a transmitted mail can be reduced. An example is described herein. In the example, a transmission log recording policy for a specific user is set that the transmission log is recorded, and it is supposed that an administrator has found that the specific user had transmitted a large amount of mails with attached files to an address outside a company after analyzing the transmission logs controlled by the control server 3. In this case, the transmitted mails transmitted by the specific user can be monitored further in detail by changing, for the specific user, the mail content storage policy that the mail content is not stored to the policy that the mail content is stored, because settings of the transmission log recording policy 41B and the mail content storage policy 41C can be appropriately changed in the first embodiment.

In the first embodiment, a mail content relating to a transmitted mail is encrypted by the client terminal 2, and the encrypted mail content is transmitted to the control server 3, which controls the encrypted mail content. As a result, even if a third party who does not have the mail content access right accesses the control server 3, the third party cannot know the content because the mail content is encrypted. As compared with a structure in which transmission logs and mail contents are controlled by a client terminal such as the client terminal 2, the structure of the first embodiment can reduce the possibility that the transmission logs and mail contents under control are falsified by a malicious user. When the process of information leakage is traced by using transmission logs and mail contents after the occurrence of the information leakage, it is difficult to understand the scale of the information leakage and leaked contents in the case that the mail contents, for example, are falsified. Therefore, the transmission logs and the mail contents are stored such that it is difficult for a user of the client terminal 2 to manipulate them. The embodiment allows transmission logs and mail contents to be immediately transmitted to the control server 3 and enables the control server 3 to properly store them.

In the first embodiment, a mail content relating to a transmitted mail is encrypted by the client terminal 2, and the encrypted mail content is transmitted to the control server 3. As a result, even if a malicious third party steals the mail content from a transmission path between the client terminal 2 and the control server 3, the third party cannot know the content because the mail content is encrypted. In the first embodiment, the client terminal 2 associates the transmission log and the encrypted mail content with each other. As a result, the transmission log and the mail content are not transmitted without being associated with each other and the control server 3 does not need to associate the transmission log and the mail content with each other. Therefore, the load of the control server 3 can be reduced when acquiring various logs from a plurality of client terminals 2.

In the first embodiment, when a request of access to a transmission log from the control console 4 is detected, and an administrator of the control console 4 has the access right to the transmission log in accordance with the transmission log access right 43D, the administrator is permitted to access the transmission log in the transmission log database 42. Therefore, a transmission log can be prevented from being accessed by a third party who does not have the access right to the transmission log.

In the first embodiment, when a request of access to a mail content from the control console 4 is detected, and an administrator of the control console 4 has the access right to the mail content in accordance with the mail content access right 43E, the administrator is permitted to access the mail content in the mail content database 44. Therefore, a mail content can be prevented from being accessed by a third party who does not have the access right to the mail content.

In the first embodiment, when the access to the mail content is permitted, the encrypted mail content is decrypted, and the resulting mail content is presented to an administrator. The encrypted mail content is automatically decrypted in this way, so that the administrator having the access right can know the mail content.

In the first embodiment, when a transmitted mail includes an attached file, the attached file is copied in addition to the body of the transmitted mail, and the mail contents including the body and the attached file are stored. Therefore, the administrator can know the content of the attached file in addition to the body of the transmitted mail.

In the first embodiment, the client terminal 2 has functions of recording the transmission log of a transmitted mail and storing a mail content of the transmitted mail without depending on the mail server 6. Therefore, the mail monitoring system of the first embodiment can be applicable to a system in which the mail server 6 is not installed in a company but is installed outside the company as an outsource, for example.

In the first embodiment, the monitoring application is used to monitor the transmission port of the client terminal 2 and to detect a transmitted mail from the mailer unit 34A. Alternatively, a mail monitor may be physically disposed between the mailer unit 34A and the transmission port in the client terminal 2. This case is described in a second embodiment.

[b] Second Embodiment

Figure 7:
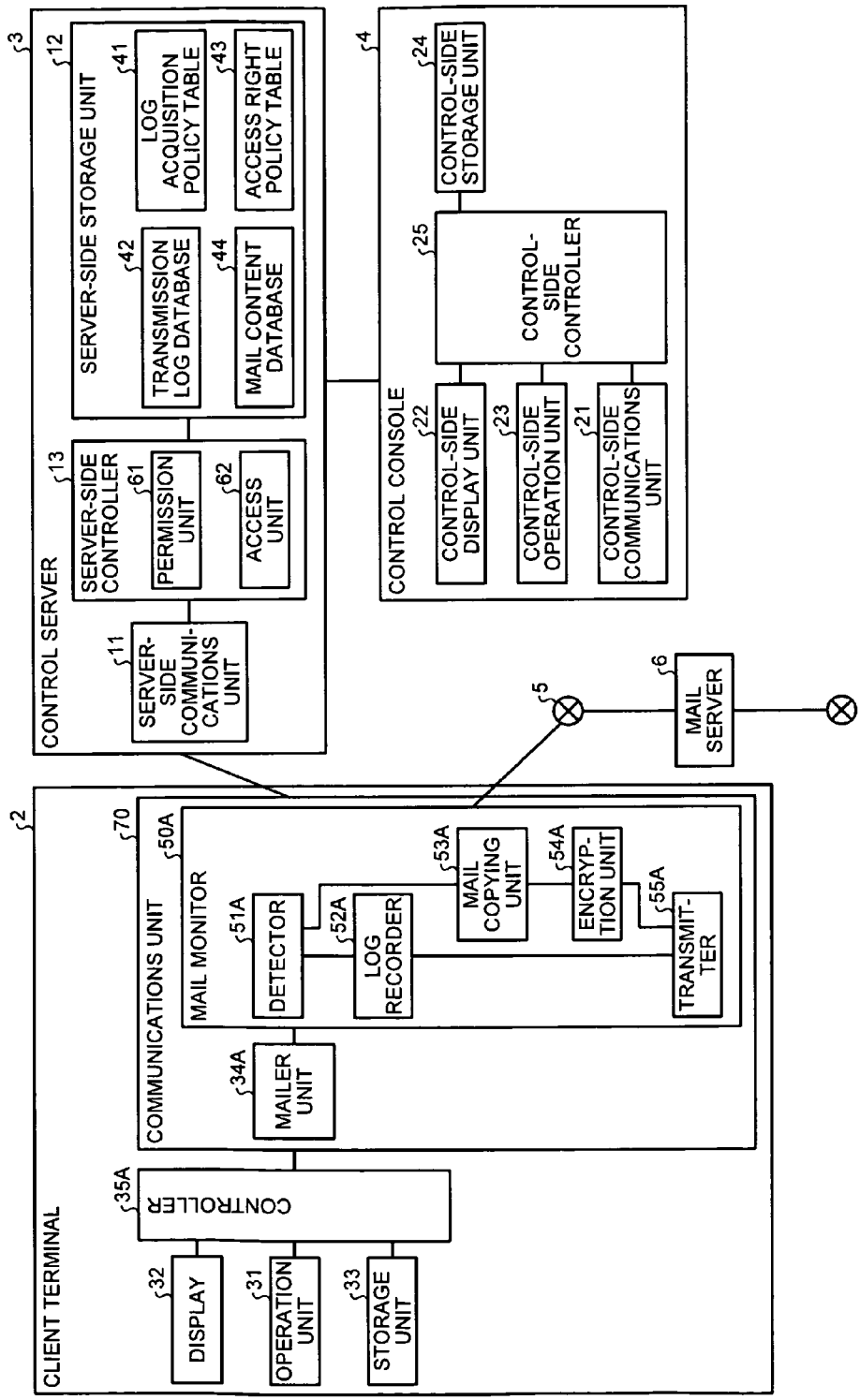
FIG. 7 is a block diagram illustrating a structure of a mail monitoring system according to a second embodiment.

FIG. 7 is a block diagram illustrating a structure of a mail monitoring system according to the second embodiment. The same structures as the mail monitoring system 1 illustrated in FIG. 1 are labeled with the same reference numerals, and the descriptions of duplicated structure and operation are omitted. A mail monitoring system 1A illustrated in FIG. 7 differs from the mail monitoring system 1 illustrated in FIG. 1 in that a controller 35A and a communications unit 70 are included instead of the controller 35 and the communications unit 34. In the communications unit 70, a mail monitor 50A is physically disposed between the mailer unit 34A and the transmission port.

The mail monitor 50 includes a detector 51A, a log recorder 52A, a mail copying unit 53A, an encryption unit 54A, and a transmitter 55A. The mail monitor 50A relays all of the mails transmitted from the mailer unit 34A to an outside of the client terminal 2. The detector 51A detects a transmitted mail when receiving the transmitted mail transmitted from the mailer unit 34A. When the detector 51A detects the transmitted mail, the log recorder 52A acquires the user's name of the transmitted mail. The log recorder 52A acquires a transmission log recording policy corresponding to the acquired user's name from the storage unit 33. The log recorder 52A determines, based on the transmission log recording policy, whether the transmitted mail corresponds to the mail whose transmission log is recorded. If the transmitted mail corresponds to the mail whose transmission log is recorded, the log recorder 52A records the transmission log relating to the transmitted mail.

When the detector 51A detects the transmitted mail, the mail copying unit 53A acquires the user's name of the transmitted mail. The mail copying unit 53A acquires a mail content storage policy corresponding to the acquired user's name from the storage unit 33. The mail copying unit 53A determines, based on the mail content storage policy, whether the transmitted mail corresponds to the mail whose content is stored. If the transmitted mail corresponds to the mail whose content is stored, the mail copying unit 53A copies the content of the transmitted mail.

The encryption unit 54A encrypts the mail content copied by the mail copying unit 53A. The transmitter 55A transmits the transmission log of the transmitted mail recorded in the log recorder 52A to the control server 3. The transmitter 55A transmits the mail content encrypted by the encryption unit 54A to the control server 3. The transmitter 55A transmits the transmitted mail detected by the detector 51A to the mail server 6 as the original transmission destination.

In the second embodiment, the mail monitor 50A is physically disposed between the mailer unit 34A and the transmission port, and the mail monitor 50A relays all of the mails transmitted from the mailer unit 34A to the outside of the client terminal 2. As a result, the mail monitor 50A can reliably detect mails transmitted from the mailer unit 34A to the outside of the client terminal 2.

In the above-described embodiments, a mail content relating to a transmitted mail is encrypted by the encryption unit 54 or 54A of the client terminal 2, and the encrypted mail content is transmitted to the control server 3. However, the mail content may be encrypted by the control server 3. This case can reduce processing burden required for encryption performed by the client terminal 2.

In the embodiments, a mail content relating to a transmitted mail is copied after the transmission log of the transmitted mail is recorded. However, the transmission log may be recorded after the mail content relating to the transmitted mail is copied.

In the embodiments, the transmission log and the mail content of a transmitted mail are individually transmitted to the control server 3. However, the transmission log and the mail content may be transmitted to the control server 3 at once.

In the embodiments, a transmitted mail is transmitted to the mail server 6 as the original transmission destination after the mail content of the transmitted mail is transmitted to the control server 3. However, the transmitted mail may be transmitted to the mail server 6 after the mail content of the transmitted mail is copied and before the mail contents is transmitted to the control server 3.

In the embodiments, the log acquisition policy table 41 controls the transmission log recording policy 41B and the mail content storage policy 41C with respect to each user's name 41A as illustrated in FIG. 2. FIG. 8 is an explanatory view illustrating another example of the log acquisition policy table 41. The log acquisition policy table 41 illustrated in FIG. 8 controls the transmission log recording policy 41B and the mail content storage policy 41C with respect to each PC name 41D of the client terminal 2. Therefore, in the mail monitoring systems 1 and 1A, the transmission log recording policy 41B and the mail content storage policy 41C can be appropriately changed with respect to each PC name 41D.

FIG. 9 is an explanatory view illustrating still another example of the log acquisition policy table 41. The log acquisition policy table 41 illustrated in FIG. 9 may control a permitted domain name 41E, a rejected domain name 41F, an attached file 41G, and a designated extension 41H, in addition to the transmission log recording policy 41B, with respect to each user's name 41A. The permitted domain name 41E specifies that a mail content of a transmitted mail is not stored when a domain name of the transmission destination of the transmitted mail corresponds to a permitted domain name. The rejected domain name 41F specifies that a mail content of a transmitted mail is stored when a domain name of the transmission destination of the transmitted mail corresponds to a rejected domain name. The attached file 41G specifies that the attached file is stored or not stored as a mail content depending on whether a file is attached or a type of attached file. The designated extension 41H specifies that the attached file is stored or not stored as a mail content depending on an extension of the attached file 41G.

In the case of the user's name "Ando" illustrated in FIG. 9, the transmission log of a transmitted mail is recorded, and the mail content of the transmitted mail is stored when the domain name of the transmission destination of the transmitted mail includes "bat.com". In the case of the user's name "Inoue", the transmission log of a transmitted mail is recorded, and an attached file is stored as the mail content when the transmitted mail includes the attached file that is not encrypted. Even when the transmitted mail includes the attached file that is not encrypted, the attached file is not stored as the mail content when the domain name of the transmission destination includes "jp.AAA.com". As an application example, mail contents of transmitted mails that are transmitted outside a company and on which special attention needs to be paid from information leakage prevention point of view, can be controlled by designating a domain name other than the in-house domain as the rejected domain.

In the case of the user's name "Ueda", the transmission log of a transmitted mail is recorded, and an attached file is stored as the mail content when the transmitted mail includes the attached file having an extension other than the designated extensions "xls" and "Doc". Even when the transmitted mail includes the attached file having an extension other than the designated extensions "xls" and "Doc", the attached file is not stored as the mail content when the domain name of the transmission destination includes "jp.AAA.com".

In the case of the user's name "Ebara", the transmission log of a transmitted mail is recorded, and a mail content of an attached file is stored when the transmitted mail includes the attached file having the designated extension of "pdf". Even when the transmitted mail includes the attached file having the designated extension of "pdf", the attached file is not stored as a mail content when the domain name of the transmission destination includes "jp.AAA.com".

Therefore, in the mail monitoring systems 1 and 1A, the storage condition of a mail content can be appropriately changed by appropriately changing the transmission log recording policy 41B, the permitted domain name 41E, the rejected domain name 41F, the attached file 41G, and the designated extension 41H with respect to each user's name 41A. The contents of the log acquisition policy table 41 can be appropriately changed according to setting operation through the control-side operation unit 23 of the control console 4.

In the embodiments, when an administrator of the control console 4 has the mail content access right, the administrator can access the mail content in the mail content database 44. For example, mail content download right may be set for each control user's name 43A. In this case, when an administrator has the mail content download right, the administrator can download the mail content from the mail content database 44. As a result, the administrator can prevent a mail content from being downloaded by a third party who does not have the mail content download right.

The components of the units illustrated in the drawings are functionally conceptual, and are not always required to be physically configured as illustrated in the drawings. That is, specific forms of distributions and integrations of the units are not limited to those illustrated in the drawings. All or part of the units can be configured to be functionally or physically distributed or integrated in arbitrary units in accordance with various loads, the usage states, and the like.

All or any part of the various processing functions performed by the units may be executed by a micro computer such as a central processing unit (CPU), a micro processing unit (MPU), and a micro controller unit (MCU). Obviously, all or any part of the various processing functions may be achieved by a program analyzed and executed by the CPU (or the micro computer such as the MPU, and MCU), or achieved by hardware based on wired logic.

Figure 10:
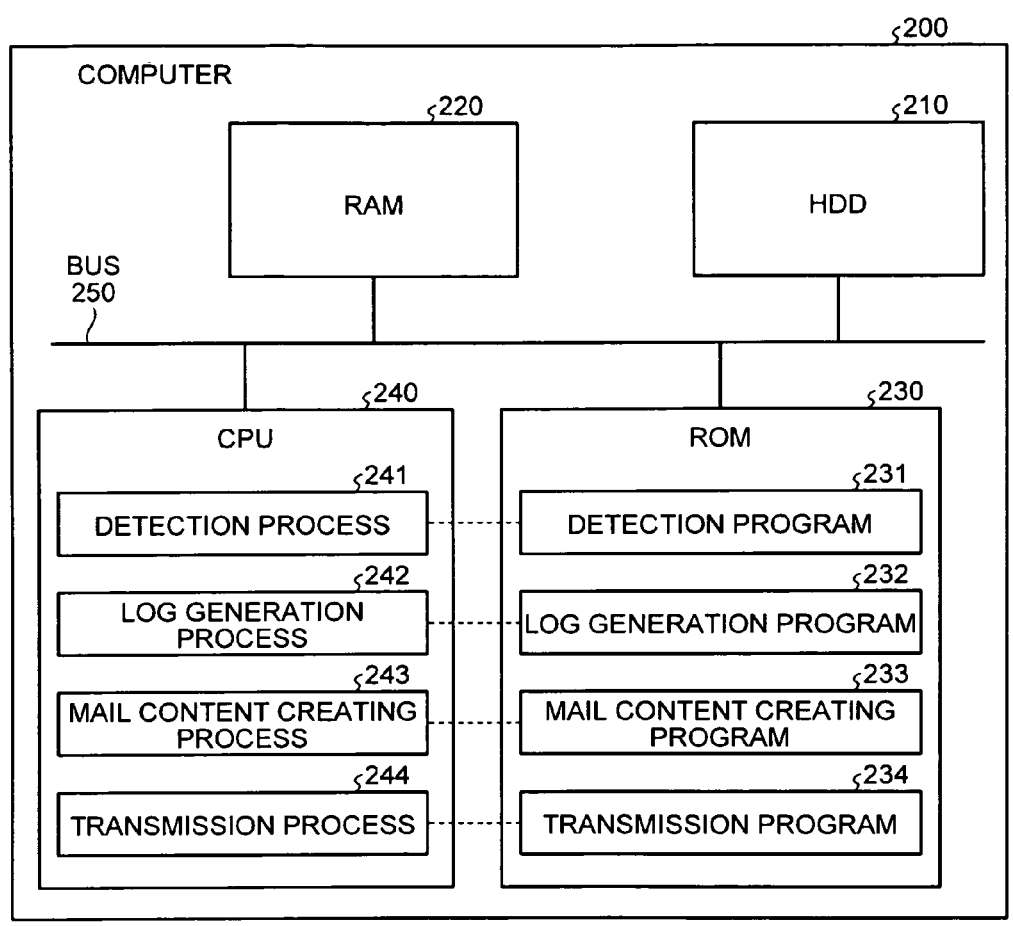
FIG. 10 is an explanatory view illustrating a computer executing a mail monitoring program.

The various processing described in the embodiments can be achieved by a computer executing a preliminarily prepared program. An example of a computer is described below that executes a program having the same functions as the above-described embodiments, with reference to FIG. 10. FIG. 10 is an explanatory view illustrating a computer executing a mail monitoring program.

As illustrated in FIG. 10, a computer 200 executing a mail monitoring program includes a hard disk drive (HDD) 210, a random access memory (RAM) 220, a read only memory (ROM) 230, a CPU 240, and a bus 250 connecting them with each other.

The ROM 230 preliminarily stores therein a mail monitoring program exhibiting the same functions as the above-described embodiments. As illustrated in FIG. 10, the mail monitoring program includes a detection program 231, a log generation program 232, a mail content creating program 233, and a transmission program 234. The programs 231 to 234 may be appropriately distributed or integrated in the same manner as the elements of the client terminal 2 illustrated in FIG. 1.

The CPU 240 reads the programs 231 to 234 from the ROM 230 and executes them. As illustrated in FIG. 10, the programs 231 to 234 function as a detection process 241, a log generation process 242, a mail content creating process 243, and a transmission process 244, respectively.

When detecting e-mail transmitted by the computer 200, the CPU 240 determines whether to generate the transmission log relating to the transmission of the e-mail on the basis of a set policy, and when it is determined to generate the transmission log, generates the transmission log. Furthermore, the CPU 240 determines whether to store mail information including the body of the e-mail on the basis of the set policy, and when it is determined to store the mail information, generates the mail information by associating the mail information with the transmission log of the e-mail. The CPU 240 transmits the mail information and the transmission log to a control server, and also transmits the e-mail to a mail server as the transmission destination. The control server receives the transmission log and the mail information of the e-mail, and controls the transmission log and the mail information of the e-mail by associating them with each other. Consequently, even if information leakage via a transmitted mail is exposed, for example, the origin and the content of the transmitted mail having caused the information leakage can be promptly identified based on the transmission log and the mail content.

The mail monitoring system can promptly identify the content and the origin of a transmitted mail.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A mail monitoring system, comprising:
a mail communications apparatus; and
a control server,
wherein
the mail communications apparatus executes a process including:
detecting a transmitted e-mail from a transmission port of the mail communications apparatus by monitoring the transmission port;
prohibiting transmitting the e-mail to a mail server;
acquiring identification information identifying a transmitter of the e-mail upon detecting the transmitted e-mail;
specifying a policy corresponding to the acquired identification information among a plurality of policies stored in a memory, each of the policies being for generating a transmission log relating to transmission of the e-mail and for storing mail information including information identifying the transmission log and information of a body of the e-mail to be transmitted;
generating the transmission log and the mail information based on the specified policy;
encrypting the mail information; and
transmitting the transmission log and the encrypted mail information to the control server, and transmitting the e-mail to the mail server; and
the control server executes a process including:
receiving the transmission log and the encrypted mail information from the mail communications apparatus; and
storing therein the received transmission log and the encrypted mail information.

2. The mail monitoring system according to claim 1, wherein
the mail communications apparatus executes the process further including:
determining whether to store mail information including information identifying the transmission log and information of the body of the e-mail to be transmitted on the basis of a mail policy corresponding to the acquired identification information, the mail policy specifying a judgment condition for storing the mail information; and
generating the mail information based on a result of the determination of storing the mail information.

3. The mail monitoring system according to claim 2, wherein
the mail communications apparatus executes the process further including:
encrypting the generated mail information, and
transmitting the encrypted mail information.

4. The mail monitoring system according to claim 2, wherein
the control server executes the process further including:
encrypting the mail information in receiving the mail information, and
storing therein the encrypted mail information when storing therein the transmission log and the mail information by associating the transmission log and the mail information with each other.

5. The mail monitoring system according to claim 2, wherein
the control server executes the process further including:
storing therein the policy and the mail policy corresponding a user name of the transmitted e-mail, and
the mail communications apparatus executes the process further including:
acquiring, when acquiring the user name of the transmitted e-mail, the policy and the mail policy corresponding to the acquired user name in the storing.

6. The mail monitoring system according to claim 4, wherein
the control server executes the process further including:
storing therein the encrypted mail information;
determining, based on a mail access policy relating to access right to the mail information when a request of access to the mail information is received from a control terminal apparatus communicating with the control server, whether a user of the control terminal apparatus has the access right to the mail information;
acquiring the encrypted mail from the storing on the basis of a determination result, and decrypting the acquired mail information; and
outputting the decrypted mail information to the control terminal apparatus.

7. A non-transitory computer readable storage medium having stored therein a mail monitoring program that causes a computer to execute a process comprising:
detecting a transmitted e-mail from a transmission port of the computer by monitoring the transmission port;
prohibiting transmitting the e-mail to a mail server;
acquiring identification information identifying a transmitter of the e-mail upon detecting the transmitted e-mail;
specifying a policy corresponding to the acquired identification information among a plurality of policies stored in a memory, each of the policies being for generating a transmission log relating to transmission of the e-mail and for storing mail information including information identifying the transmission log and information of a body of the e-mail to be transmitted;
generating the transmission log and the mail information based on the specified policy;
encrypting the mail information; and
transmitting the transmission log and the encrypted mail information to a control server, and transmitting the e-mail to the mail server.

8. The non-transitory computer readable storage medium according to claim 7, wherein
the mail monitoring program causes the computer to execute the process further including:
determining whether to store mail information including information identifying the transmission log and information of the body of the e-mail to be transmitted on the basis of a mail policy corresponding to the acquired identification information, the mail policy specifying a judgment condition for storing the mail information;
generating the mail information based on a result of the determination of storing the mail information, the mail information including an attached file the when the e-mail has the attached file; and
transmitting the mail information to the control server.

9. The non-transitory computer readable storage medium according to claim 8, wherein
the transmitting includes transmitting the mail information and the transmission log to the control server executing a process comprising:
storing in a storage the transmission log and the mail information from the computer;
first determining, based on a log access policy relating to access right to the transmission log, whether a user of a control terminal apparatus has the access right to the transmission log in the storage;
second determining, based on a mail access policy relating to access right to the mail information, whether the user has the access right to the mail information in the storage; and
outputting the mail information and the transmission log to the control terminal apparatus based on a result of the first and the second determination.

10. The non-transitory computer readable storage medium according to claim 8, wherein
the transmitting the mail information to the control server includes encrypting the mail information and transmitting the encrypted mail information.

11. The non-transitory computer readable storage medium according to claim 8, wherein
the mail monitoring program causing the computer to execute the process further comprising encrypting the generated mail information, and wherein the transmitting the mail information includes transmitting the encrypted mail information to the control server.

12. A mail monitoring apparatus including:
a processor; and
a memory, wherein the processor executes:
detecting a transmitted e-mail from a transmission port of the mail monitoring apparatus by monitoring the transmission port;
prohibiting transmitting the e-mail to a mail server;
acquiring identification information identifying a transmitter of the e-mail upon detecting the transmitted e-mail;
specifying a policy corresponding to the acquired identification information among a plurality of policies stored in a memory, each of the policies being for generating a transmission log relating to transmission of the e-mail and for storing mail information including information identifying the transmission log and information of a body of the e-mail to be transmitted;
generating the transmission log and the mail information based on the specified policy;
encrypting the mail information; and
transmitting the transmission log and the encrypted mail information to a control server, and transmitting the e-mail to the mail server.

13. The mail monitoring apparatus according to claim 12, wherein the processor executes the process further including:
first determining whether to store mail information including information identifying the transmission log and information of the body of the e-mail to be transmitted on the basis of a mail policy corresponding to the acquired identification information, the mail policy specifying a judgment condition for storing the mail information;
generating the mail information based on a result of the determination of storing the mail information; and
transmitting the mail information and the transmission log to the control server executing a process comprising:
storing the transmission log and the mail information from the mail monitoring apparatus;
second determining, based on a log access policy relating to access right to the transmission log, whether a user of a control terminal apparatus has the access right to the transmission log;
third determining, based on a mail access policy relating to access right to the mail information, whether the user has the access right to the mail information; and
outputting the mail information and the transmission log to the control terminal apparatus based on a result of the second and the third determination.

14. A mail monitoring method implemented by a mail monitoring apparatus, the mail monitoring method comprising:
detecting a transmitted e-mail from a transmission port of the mail monitoring apparatus by monitoring the transmission port;
prohibiting transmitting the e-mail to a mail server;
acquiring identification information identifying a transmitter of the e-mail upon detecting the transmitted e-mail;
specifying a policy corresponding to the acquired identification information among a plurality of policies stored in a memory, each of the policies being for generating a transmission log relating to transmission of the e-mail and for storing mail information including information identifying the transmission log and information of a body of the e-mail to be transmitted;
generating the transmission log and the mail information based on the specified policy;
encrypting the mail information; and
transmitting the transmission log and the encrypted mail information to a control server, and transmitting the e-mail to the mail server.

* * * * *